(No Model.)

C. H. MORS.
CHECK HOOK.

No. 400,410. Patented Mar. 26, 1889.

Witnesses:
S. B. Brewer
W. M. Brown

Inventor:
CHARLES H. MORS,
by William H. Low
Attorney.

UNITED STATES PATENT OFFICE.

CHARLES H. MORS, OF WEST TROY, NEW YORK.

CHECK-HOOK.

SPECIFICATION forming part of Letters Patent No. 400,410, dated March 26, 1889.

Application filed May 1, 1888. Serial No. 272,402. (No model.)

*To all whom it may concern:*

Be it known that I, CHARLES H. MORS, of West Troy, in the county of Albany and State of New York, have invented certain new and useful Improvements in Safety Check-Hooks, of which the following is a specification.

My invention relates to improvements in safety check-hooks for harness for horses; and the object of my invention is to provide a simple and reliable device for securely holding the check-strap of a harness in such manner that it will not be accidentally released from the saddle. This object I attain by the mechanism illustrated in the accompanying drawings, which is herein referred to and forms part of this specification, and in which—

Figure 1:
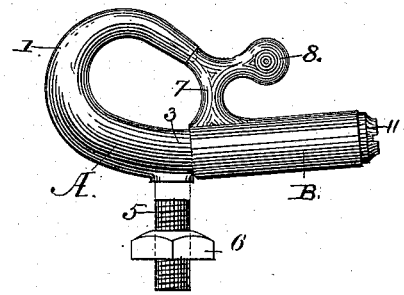
Figure 2:
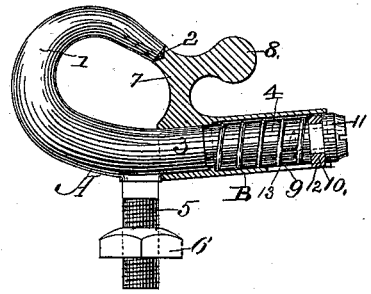
Figure 3:
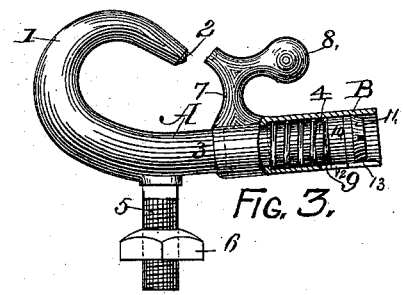
Figure 4:
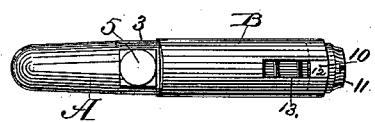
Figure 5:
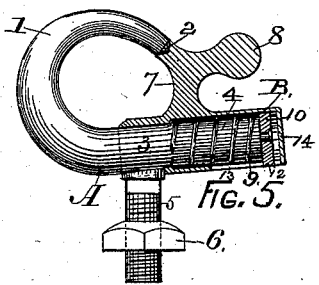

Figure 1 is a side elevation of one form of my safety check-hook in a closed condition. Fig. 2 is a like elevation with the sliding guard shown in vertical section. Fig. 3 is a like elevation with the sliding guard moved back to open the check-hook for the passage of the check-strap. Fig. 4 is an inverted plan view of Fig. 1. Fig. 5 is a side elevation of a modified form of my safety check-hook in a closed condition, with the sliding guard shown in vertical section; and Fig. 6 is an inverted plan view of the same with the sliding guard in its entirety.

As represented in the drawings, A designates the hook-piece of my check-hook, which is provided with a hook, 1, that is preferably made with a coniform or convex point, 2. Said hook is formed on the forward part of a cylindrical body, 3, which has an after-body, 4, of a smaller diameter. From the body 3 a screw-stud, 5, is pendent for the purpose of securing the device to the harness-saddle, and said screw-stud with a screw-nut, 6, for effecting said purpose.

B is the sliding guard, made in the form of a sleeve, that is fitted to slide on the body 3, and provided with an arm, 7, whose forward end is preferably hollowed out to form a snug joint with the point of the hook 1, and thereby giving greater stability to the sliding guard by preventing it from being turned sidewise from its engagement with the hook 1. A rearwardly-projecting thumb-piece, 8, is formed on the arm 7 for the purpose of affording a ready means for retracting said sliding guard from contact with the hook 1. The sleeve of the sliding guard is chambered to receive a coiled spring, 9, which surrounds the after-body 4, and is fitted so that one end will bear against a shoulder in the bore of the sleeve and the opposite end will bear against a collar, 10, that is secured to the rearmost end of the after-body, either by means of a screw, 11, as shown in Fig. 2, or by riveting, as shown in Fig. 5. Said collar is provided with a spur, 12, which engages in a slot, 13, in the sleeve of the sliding guard and forms a guide for the latter. The spring 9 forces the arm 7 of the sliding guard in contact with the point of the hook 1 and normally retains the device in a closed condition.

Figure 6:
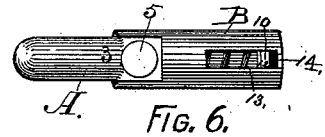

In the modification shown in Figs. 5 and 6, whereby I am enabled to shorten the device considerably, the lower side of the sleeve of the sliding guard B is slotted at its forward end to allow it to pass beyond the pendent screw-stud 5. As shown in said modification, the rearmost end of the sleeve of the sliding guard B is closed by a cap-piece, 14, which is soldered or otherwise secured in its place in finishing the device, and, when preferred, this mode of finishing the end of the sliding guard may be adopted in any form of the device when the collar 10 is riveted to the end of the after-body.

My check-hook is operated in the following manner: To open the device for the purpose of inserting therein or removing therefrom the bight of the check-strap, the sliding guard B is drawn back into the position shown in Fig. 3, so as to leave clear space between the point of the hook 1 and the forward end of the arm 7, and through said space the check-strap can be freely passed edgewise. Upon the releasement of the backward strain from the sliding guard the spring 9 forces the said guard forward to bring the arm 7 into close contact with the end of the hook 1, thereby closing the device.

I claim as my invention—

A safety check-hook which consists of a stationary body-piece, A, comprising a hook, 1, a main body, 3, having a pendent stud, 5, by which the device is secured to the harness, and an after-body, 4, of smaller diameter than said main body, said after-body having a collar, 10, provided with a tongue, 12, secured thereto, a sliding guard, B, having the form of a chambered sleeve and provided with an arm, 7, that is fitted to engage against the end of the hook 1, and having a slot, 13, in which the tongue 12 engages to guide said sliding guard, and a coiled spring, 9, which surrounds said after-body and is interposed between the collar 10 and a shoulder formed by the chambered bore of the sliding guard, the latter being fitted to have a sliding movement on and to be guided by the body 3 and collar 10, as and for the purpose herein specified.

CHARLES H. MORS.

Witnesses:
WM. H. LOW,
S. B. BREWER.